(12) United States Patent
Mandry (10) Patent No.: US 12,465,891 B2
(45) Date of Patent: Nov. 11, 2025

(54) DIALYSER, DIALYSIS EQUIPMENT AND KIT AND METHOD FOR PRODUCING A DIALYSER

(71) Applicant: B. Braun Avitum AG, Melsungen (DE)

(72) Inventor: Peter Mandry, Dresden (DE)

(73) Assignee: Braun Avitum AG, Melsungen (DE)

( * ) Notice: Subject to any disclaimer, the term of this patent is extended or adjusted under 35 U.S.C. 154(b) by 550 days.

(21) Appl. No.: 17/912,172

(22) PCT Filed: Mar. 4, 2021

(86) PCT No.: PCT/EP2021/055476
§ 371 (c)(1),
(2) Date: Sep. 16, 2022

(87) PCT Pub. No.: WO2021/185591
PCT Pub. Date: Sep. 23, 2021

(65) Prior Publication Data
US 2023/0139698 A1    May 4, 2023

(30) Foreign Application Priority Data
Mar. 19, 2020   (DE) ............... 10 2020 203 553.9

(51) Int. Cl.
B01D 63/02  (2006.01)
A61L 15/28  (2006.01)
C08L 5/08   (2006.01)

(52) U.S. Cl.
CPC .......... B01D 63/0233 (2022.08); *A61L 15/28* (2013.01); *C08L 5/08* (2013.01)

(58) Field of Classification Search
CPC .................................................. B01D 63/0233
See application file for complete search history.

(56) References Cited

U.S. PATENT DOCUMENTS

| 4,276,687 A | 7/1981 | Schnell |
| 4,940,617 A * | 7/1990 | Baurmeister ......... B29C 70/222 |
| | | 428/113 |
| 7,883,048 B2 | 2/2011 | Hörmann |
| 10,814,056 B2 | 10/2020 | Zaniboni et al. |
| 2003/0197308 A1 | 10/2003 | Montoya |

FOREIGN PATENT DOCUMENTS

| CN | 202288996 U | 7/2012 |
| DE | 19806293 A1 | 8/1999 |
| DE | 19782098 | 11/1999 |

(Continued)

OTHER PUBLICATIONS

Bonar Pure, Performance Driven Filtration, Colback WA Product Data Sheet, Mar. 2017, 1 page.

(Continued)

*Primary Examiner* — Andrew T Piziali
(74) *Attorney, Agent, or Firm* — Christopher A. Rothe; CM Law (57) ABSTRACT

A dialyzer, a dialysis machine, a kit and a process for producing the dialyzer. The dialyzer includes a plurality of hollow fibers disposed in a housing of the dialyzer. The hollow fibers are wrapped with a textile fabric that is fluid-permeable and/or at least partly water-soluble.

18 Claims, 2 Drawing Sheets

(56) References Cited

FOREIGN PATENT DOCUMENTS

| | | |
|---|---|---|
| EP | 2056956 B1 | 12/2012 |
| GB | 2059290 A | 4/1981 |
| JP | H08168525 A | 7/1996 |
| JP | 4069998 B2 | 4/2008 |
| NO | 2008025459 A1 | 3/2008 |
| WO | 9822161 A1 | 5/1998 |
| WO | 2013095682 A1 | 6/2013 |

OTHER PUBLICATIONS

Search Report received in International Application No. PCT/EP2021/055476, dated Jun. 10, 2021, with translation, 7 pages.
Written Opinion received in International Application No. PCT/EP2021/055476, dated Jun. 10, 2021, with translation, 12 pages.
Office Action received in Chinese Application No. 202180036059.4 dated Jun. 16, 2025, with translation, 21 pages.

\* cited by examiner

DIALYSER, DIALYSIS EQUIPMENT AND KIT AND METHOD FOR PRODUCING A DIALYSER

CROSS-REFERENCE TO RELATED APPLICATIONS

This application is the United States national stage entry of International Application No. PCT/EP2021/055476, filed Mar. 4, 2021, and claims priority to German Application No. 10 2020 203 553.9, filed Mar. 19, 2020. The contents of International Application No. PCT/EP2021/055476 and German Application No. 10 2020 203 553.9 are incorporated by reference herein in their entireties.

FIELD

The invention relates to a dialyzer, a dialysis machine, and also a kit and a process for producing a dialyzer.

BACKGROUND

The possible applications of hollow fibers include their use as semipermeable membranes (called hollow fiber membranes) in the production of dialyzers. Dialyzers are filter modules for extracorporeal blood treatment, such as hemodialysis, hemofiltration and hemodiafiltration, for example. Hollow fibers of this kind may also be referred to as membrane fibers.

Dialyzers represent the heart of a dialysis machine. Dialyzers customarily have a tubular dialyzer housing with a longitudinal extent. In the interior of the dialyzer there are hollow fibers or membrane fibers arranged parallel to one another. The blood to be treated or cleaned flows through the interior of the hollow fibers, while an opposite flow of a dialysate passes through the exterior of the hollow fibers and also the interior of the dialyzer housing. The semipermeable membranes of the hollow fibers perform both water exchange and mass transfer. In particular, water and toxins are removed from a patient's blood.

For the production of the dialyzers, the hollow fibers are laid down in the form of bundles and wrapped with a casing film. The functions of the casing film are twofold. On the one hand it maintains the bundle form of the hollow fibers. On the other hand the casing film protects the outer hollow fibers in the bundle against damage during the production operation, especially during the insertion of the wrapped hollow fiber bundle into a dialyzer housing. In presently customary processes for producing dialyzers, the casing film must be removed from the wrapped hollow fiber bundle after it has been inserted into the dialyzer housing. Otherwise the casing film would, on the one hand, disrupt the distribution of a casting compound used for producing a hollow fiber embedment during casting of the hollow fibers. On the other hand, the casing film in operation of the dialyzer would hinder the flow of dialysate and therefore would hinder a uniform flow around the hollow fibers. Corresponding dialyzers are known for example from publications DE 197 82 098 T2, JP 4069998 B2, and EP 2 056 956 B1.

A disadvantage is that when the casing film is extracted from the dialyzer housing, the bending of individual hollow fibers may result in bent fibers. These fibers cannot be cast at their axial end portions with the casting compound, polyurethane for example, and therefore they have their opening not in the extracorporeal blood circulation but instead in the circulation of the dialyzing fluid. The consequence is that, in the course of the as-intended service of the dialyzer, a blood leak develops, meaning that blood flows into the dialysate circulation of a dialysis machine. Before they are dispatched, therefore, there is a standard requirement for dialyzers to be tested for the presence of such defects as part of an integrity test. The dialyzers affected by such defects represent an unwanted discard. The presence of bent fibers is the cause of about 2% to 5% of the discard in the case of dialyzers. This gives bent fibers a significant ranking, from a production standpoint, as a cause of discards.

The phenomenon of the bent fibers increases with the packing density, this being the number of hollow fibers wrapped by the casing film. As the packing density increases, the hollow fibers exert an increasingly higher pressure on the casing film from the inside. As a result, after the insertion of the wrapped hollow fiber bundle into the dialyzer housing, the casing film is jammed between dialyzer housing and hollow fibers. With increasing pressure, however, there is a risk of increasing numbers of fibers being carried with the casing film when it is extracted, and becoming bent. This in turn has the consequence that the hollow fiber packing density attainable in principle is restricted because of the risk of the incidence of discards owing to bent fibers. And yet a high hollow fiber packing density has great advantages for the user. For instance, a higher hollow fiber packing density makes it easier to vent the dialyzer without rotation.

A problem addressed by the invention is therefore that of providing a dialyzer which avoids the disadvantages stated at the outset in connection with conventional dialyzers, more particularly which reduces or even eliminates entirely the risk of discards owing to bent fibers. A further problem addressed by the invention is that of providing a dialysis machine and also a kit and a process for producing a dialyzer.

SUMMARY

According to a first aspect the invention relates to a dialyzer.

The dialyzer comprises a multiplicity of hollow fibers. The hollow fibers are semipermeable, meaning that both water exchange and mass transfer are possible via the walls of the hollow fibers. The hollow fibers are typically polymeric hollow fibers. The hollow fibers may for example be formed of polysulfone. The hollow fibers may have a length of 5 cm to 200 cm, more particularly 10 cm to 100 cm, preferably 15 cm to 45 cm. The hollow fibers may further have a wall thickness of 10 µm to 200 µm, more particularly 15 µm to 50 µm, preferably 20 µm to 40 µm. The hollow fibers may further have an internal diameter of 50 µm to 2 mm, more particularly 100 µm to 500 µm, preferably 150 µm to 250 µm. The hollow fibers may further have an outer diameter of 60 µm to 3 mm, more particularly 100 µm to 1 mm, preferably 160 µm to 300 µm.

The multiplicity of hollow fibers, or the hollow fibers, are disposed in a housing, i.e., in an interior of a housing, in the dialyzer. The multiplicity of hollow fibers, or the hollow fibers, are in an arrangement extending usefully in the longitudinal direction of the dialyzer housing and more particularly transverse to the longitudinal direction of the dialyzer housing, alongside one another. The hollow fibers preferably have an arrangement parallel or substantially parallel to one another.

The housing of the dialyzer is customarily tubular. The housing may in principle possess a circular, elliptical, oval or polygonal, as for example triangular, rectangular, square, pentagonal or hexagonal, cross section. The housing of the dialyzer preferably has the shape of a round tube, i.e., is designed as a tube having a circular cross section.

A particular feature of the dialyzer according to the present invention is that the multiplicity of hollow fibers, or the hollow fibers, are wrapped in the housing of the dialyzer with a textile fabric, the textile fabric being fluid-permeable, more particularly water- and/or dialysate-permeable, and/or at least partly, more particularly only partly or completely, water-soluble in design. The textile fabric holds together the hollow fibers preferably in bundle form, i.e., in the form of a hollow fiber bundle. The hollow fiber bundle may possess a circular, elliptical, oval or polygonal, as for example triangular, rectangular, square, pentagonal or hexagonal, cross section. The hollow fiber bundle preferably possesses a circular cross section.

The textile fabric wound around the hollow fibers or hollow fiber bundle may also be referred to in the sense of the present invention as a textile casing wrap or textile wrapped structure. In this case the hollow fibers or the hollow fiber bundle may be wrapped in one or more plies, more particularly at least in sections, preferably only in sections, with three plies, by the fabric.

The expression "dialysate-permeable" used in the context of the textile fabric is intended in the sense of the present invention to refer to a textile fabric which is permeable to a dialysate.

The expression "dialysate" is intended in the sense of the present invention to refer to an aqueous solution which is used in kidney replacement therapy, especially in the case of hemodialysis, in order to take up dissolved substances from the blood and/or to deliver them to the blood. The dialysate comprises, in particular, electrolytes, glucose, and buffers in a composition corresponding fundamentally to the blood serum.

The invention is notable in particular for the following advantages:

Owing to the fluid-permeable and/or at least partly water-soluble design of the textile fabric, it offers no significant resistance to dialysate flow during as-intended use of the dialyzer and to a casting compound for producing a hollow fiber embedment during the production of the dialyzer.

The textile fabric can therefore remain in the dialyzer or—in the case of an at least partly water-soluble textile fabric—can remain at least initially in the dialyzer. There is no need for the fabric to be removed or extracted. Instances of damage to the hollow fibers, especially in the form of bent fibers, as occur during the production of conventional dialyzers, can be considerably reduced or even avoided entirely. This in turn produces a significant lowering of the discard rate.

As a result of the lowering of the discard rate, the production costs of the dialyzer can be perceptibly reduced.

If the textile fabric is water-soluble, it can be dissolved and flushed out of the dialyzer housing after the hollow fibers wrapped with the textile fabric have been inserted into a dialyzer housing, when the hollow fibers undergo leak testing (by means of what is called the bubble test), in which dialyzers are flushed with water.

Because the textile fabric can remain in the dialyzer and/or be at least partly water-soluble, there is no need for the textile fabric to be disposed of.

A further advantage is that a higher packing density of the hollow fibers and hence in particular a larger diameter of the hollow fiber bundle can be chosen than is the case with conventional dialyzers. This markedly simplifies the handling of the dialyzer of the invention. For instance, a higher packing density makes it possible in particular for the dialyzer to be vented without rotation and hence more simply.

A further advantage, finally, is that the textile fabric can be specifically functionalized, with the textile fabric able as a result to take on additional roles, such as the role, for example, of an adsorber for DNA and/or endotoxin and/or bacteria and/or viruses.

In an embodiment of the invention, the textile fabric has a pore diameter, more particularly mean pore diameter, of 0.1 µm to 10 mm, more particularly 200 µm to 1 mm, preferably 1 mm to 5 mm. The pore diameter, more particularly mean pore diameter, of the textile fabric is determined preferably by means of mercury porosimetry. The pore diameters disclosed in this paragraph have proven particularly advantageous from the standpoint of fluid permeability of the textile fabric.

In further embodiment of the invention, the textile fabric is designed as a web or nonwoven fabric, preferably as a nonwoven fabric.

The expression "nonwoven fabric" in the sense of the present invention is intended to refer to a structure of fibers, more particularly spun fibers (staple fibers) and/or continuous fibers (filaments), and/or yarns, more particularly chopped yarns, of any kind and any origin, which have been assembled in any way to form a web (a fiber layer or fiber tuft) and connected to one another in any way, with the exception of the intercrossing or interlooping of fibers or yarns as occurs in the case of weaving, knitting, lacemaking, braiding, and the production of tufted products.

The expression "yarns" is intended in the sense of the present invention to refer to linear textile constructs of two or more fibers.

The web or the nonwoven fabric may comprise fibers or yarns having a diameter of 1 µm to 1 mm, more particularly 10 µm to 100 µm, preferably 20 µm to 50 µm.

The web or the nonwoven fabric may further comprise fibers having a linear density of 1 dtex to 150 dtex, more particularly 1 dtex to 10 dtex, preferably 1 dtex to 3 dtex.

The web or the nonwoven fabric may further have a thickness of 0.01 mm to 5 mm, more particularly 0.05 mm to 1 mm, preferably 0.1 mm to 0.5 mm.

The web or the nonwoven fabric may further have a basis weight of 0.1 $g/mm^2$ to 500 $g/mm^2$, more particularly 1 $g/mm^2$ to 100 $g/mm^2$, preferably 10 $g/mm^2$ to 50 $g/mm^2$.

The web or the nonwoven fabric may further have an air permeability of 10 l/m2s to 10 000 l/m2s, more particularly 100 l/m2s to 5000 l/m2s, preferably 1000 l/m2s to 5000 l/m2s.

In further embodiment of the invention, the textile fabric is designed as a woven fabric.

The expression "woven fabric" is intended in the sense of the present invention to refer to a textile fabric composed of two thread systems, namely warp (warp threads) and weft (weft threads), which when the woven fabric surface is viewed straight on intersect one another patternwise at an angle of exactly or approximately 90°.

The woven fabric may have rectangular or square meshes.

The woven fabric may further comprise threads, more particularly yarns and/or twists, and/or fibers having a diameter of 1 µm to 1 mm, more particularly 10 µm to 100 µm, preferably 20 µm to 50 µm.

The expression "twists" is intended in the sense of the present invention to refer to a linear textile composed of multiple yarns twisted together.

The woven fabric may further comprise threads, more particularly yarns and/or twists, and/or fibers having a linear density of 1 dtex to 150 dtex, more particularly 1 dtex to 10 dtex, preferably 1 dtex to 3 dtex.

The woven fabric may further have a thickness of 0.01 mm to 5 mm, more particularly 0.05 mm to 1 mm, preferably 0.1 mm to 0.5 mm.

The woven fabric may further have a basis weight of 0.1 $g/mm^2$ to 500 $g/mm^2$, more particularly 1 $g/mm^2$ to 100 $g/mm^2$, preferably 10 $g/mm^2$ to 50 $g/mm^2$.

The woven fabric may further have a fabric fineness of 0.1 mesh to 1000 mesh, more particularly 1 mesh to 200 mesh, preferably 1 mesh to 50 mesh.

The expression "fabric fineness" is intended in the sense of the present invention to refer to the number of meshes of the woven fabric per imperial inch (25.4 mm).

The woven fabric may further have a gauge of 0.01 mm to 100 mm, more particularly 1 mm to 20 mm, preferably 2 mm to 10 mm.

The expression "gauge" is intended in the sense of the present invention to refer to the spacing of the threads and/or fibers of the woven fabric from thread center to thread center and/or from fiber center to fiber center. Where the woven fabric, for example, is a fabric having square meshes, the gauge is the same in warp and weft directions.

The woven fabric may further be designed as a plain weave, satin weave or atlas weave fabric, meaning that the warp and weft threads may be intercrossed in plain, satin or atlas weave.

The woven fabric may further have an air permeability of 10 l/m2s to 10 000l/m2s, more particularly 100l/m2s to 5000l/m2s, preferably 1000 l/m2s to 5000l/m2s.

The textile fabric may alternatively be designed as a knitted fabric.

More particularly the textile fabric may have a netlike design.

The textile fabric, more particularly fibers and/or threads, more particularly yarns and/or twists, of the textile fabric, preferably comprises a weldable material or consists of such a material. The weldable material preferably comprises a weldable polymer. In terms of suitable weldable polymers, reference is made to the polymers described below. It is possible as a result, with particular advantage, to achieve a secure closure or a secure fastening of the textile fabric (with formation of a textile casing wrap or textile wrapped structure), more particularly without additional bonding means, such as adhesive strips, for example. In accordance with the invention it is preferred, therefore, if the textile fabric wound around the hollow fibers is fastened or closed without additional bonding means, more particularly without adhesive strips.

In further embodiment of the invention, the textile fabric comprises fibers having a fiber core and a fiber sheath surrounding the fiber core at least partly, more particularly only partly, or completely, preferably completely; in other words, it comprises fibers having a core-sheath construction. The fibers are preferably multicomponent fibers, more particularly bicomponent fibers.

The expression "multicomponent fibers" is intended in the sense of the present invention to refer to fibers which comprise at least two polymers which are securely but separably connected to one another and which differ in their chemical and/or physical construction, or consist of at least two such polymers.

The expression "bicomponent fibers" is intended in the sense of the present invention to refer to fibers which comprise only two polymers which are securely but separably connected to one another and which differ in their chemical and/or physical construction, or consist only of two such polymers.

In further embodiment of the invention, the fiber core comprises a fiber core polymer and the fiber sheath comprises a fiber sheath polymer, the fiber core polymer having a melting point higher than that of the fiber sheath polymer. As a result it is possible, with particular advantage, for the textile fabric wound around the hollow fibers to be securely fastened or securely closed, in particular without, for example, the risk of the wound textile fabric suffering weld penetration and hence of damage to the wrapped hollow fibers. Accordingly, for the fastening or closing of the wound textile fabric, it is possible, for example, to choose a welding temperature at which the fiber sheath polymer does melt, but not the fiber core polymer. In this way it is possible to prevent a welding bar from penetrating through to the hollow fibers.

The melting point of the fiber core polymer is preferably at least 10° C., more particularly at least 20° C., preferably at least 30° C. higher than the melting point of the fiber sheath polymer.

In further embodiment of the invention, the fiber core polymer is selected from the group consisting of polyterephthalates, polyalkylene terephthalates, polyethylene terephthalate, polypropylene terephthalate, polybutylene terephthalate, polyolefins, polyethylene, high-density polyethylene, low-density polyethylene, linear low-density polyethylene, high molecular mass polyethylene, ultra-high molecular mass polyethylene, polypropylene, and combinations, more particularly mixtures, of at least two of the aforesaid fiber core polymers.

The fiber core polymer is preferably a polyalkylene terephthalate, more particularly polyethylene terephthalate, polypropylene terephthalate or polybutylene terephthalate. With particular preference the fiber core polymer comprises polyethylene terephthalate.

In further embodiment of the invention, the fiber sheath polymer is selected from the group consisting of polyamides, copolyamides, polyamide 6 (PA 6 or polycaprolactam), polyamide 6.6 (PA 6.6, i.e., polyamide produced by polymerization of hexamethylenediamine and adipic acid), polyamide 6T (PA 6T, i.e., polyamide produced by polymerization of hexamethylenediamine and terephthalic acid), polyamide 6.9 (PA 6.9, i.e., polyamide produced by polymerization of hexamethylenediamine and azelaic acid), polyamide 6.12 (PA 6.12, i.e., polyamide produced by polymerization of hexamethylenediamine and dodecanedioic acid or of caprolactam and laurolactam), polyamide 11 (PA 11 or 11-aminoundecanoic acid), polyamide 12 (PA 12 or laurolactam or omega-aminododecanoic acid), polyamide 4.6 (PA 4.6, i.e., polyamide produced by polymerization of tetramethylenediamine and adipic acid), polyamide 12.12 (PA 12.12, i.e., polyamide produced by polymerization of dodecanediamine and dodecanedioic acid), polyamide 10.10 (PA 10.10, i.e., polyamide produced by polymerization of 1,10-decamethylenediamine and 1,10-decanedioic acid) and combinations, more particularly mixtures, of at least two of the aforesaid fiber sheath polymers.

The fiber sheath polymer is preferably polyamide 6.

In further embodiment of the invention, the fiber core polymer is a polyalkylene terephthalate, more particularly polyethylene terephthalate, and/or the fiber sheath polymer is a polyamide, more particularly polyamide 6. With particular preference the fiber core polymer is a polyalkylene terephthalate, more particularly polyethylene terephthalate, and the fiber sheath polymer is a polyamide, more particularly polyamide 6. As a result of the polymer combinations disclosed in this paragraph it is possible with particular advantage to achieve particularly secure fastening or particularly secure closure of the fabric, by means of welding, for example.

The textile fabric is preferably a nonwoven fabric available commercially under the registered trademark COLBACK® WA 30. This is a nonwoven fabric with fibers which have a core-sheath construction. The fiber core comprises polyethylene terephthalate or consists of polyethylene terephthalate. The fiber sheath comprises polyamide 6 or consists of polyamide 6. This nonwoven fabric, furthermore, has a basis weight of 30 g/m$^2$, a thickness of 0.25 mm, an air permeability (1 mbar) of 4500 l/m$^2$s, a breaking strength of 55 N/5 cm, an elongation at break of 16%, a tear resistance of 40 N, a stiffness of 0.3 mN, and a fiber diameter of 37 μm.

The textile fabric may alternatively preferably be a nonwoven fabric available commercially under the registered trademark COLBACK® WA 50. This is a nonwoven fabric with fibers which have a core-sheath construction. The fiber core comprises polyethylene terephthalate or consists of polyethylene terephthalate. The fiber sheath comprises polyamide 6 or consists of polyamide 6. This nonwoven fabric, furthermore, has a basis weight of 50 g/m$^2$, a thickness of 0.35 mm, an air permeability (1 mbar) of 4000 l/m$^2$s, a breaking strength of 150 N/5 cm, an elongation at break of 22%, a tear resistance of 75 N, a stiffness of 1.2 mN, and a fiber diameter of 37 μm.

The textile fabric may alternatively preferably be a nonwoven fabric available commercially under the registered trademark COLBACK® WA 75. This is a nonwoven fabric with fibers which have a core-sheath construction. The fiber core comprises polyethylene terephthalate or consists of polyethylene terephthalate. The fiber sheath comprises polyamide 6 or consists of polyamide 6. This nonwoven fabric, furthermore, has a basis weight of 75 g/m$^2$, a thickness of 0.5 mm, an air permeability (1 mbar) of 3700 l/m$^2$s, a breaking strength of 240 N/5 cm, an elongation at break of 26%, a tear resistance of 125 N, a stiffness of 3.2 mN, and a fiber diameter of 37 μm.

The textile fabric may alternatively preferably be a nonwoven fabric available commercially under the registered trademark COLBACK® WA 100. This is a nonwoven fabric with fibers which have a core-sheath construction. The fiber core comprises polyethylene terephthalate or consists of polyethylene terephthalate. The fiber sheath comprises polyamide 6 or consists of polyamide 6. This nonwoven fabric, furthermore, has a basis weight of 100 g/m$^2$, a thickness of 0.55 mm, an air permeability (1 mbar) of 3400 l/m$^2$s, a breaking strength of 340 N/5 cm, an elongation at break of 29%, a tear resistance of 170 N, a stiffness of 4.6 mN, and a fiber diameter of 37 μm.

The textile fabric may alternatively preferably be a nonwoven fabric available commercially under the registered trademark COLBACK® WA 120. This is a nonwoven fabric with fibers which have a core-sheath construction. The fiber core comprises polyethylene terephthalate or consists of polyethylene terephthalate. The fiber sheath comprises polyamide 6 or consists of polyamide 6. This nonwoven fabric, furthermore, has a basis weight of 120 g/m$^2$, a thickness of 0.65 mm, an air permeability (1 mbar) of 2900 l/m$^2$s, a breaking strength of 430 N/5 cm, an elongation at break of 29%, a tear resistance of 205 N, a stiffness of 8.3 mN, and a fiber diameter of 37 μm.

In further embodiment of the invention, the textile fabric, more particularly the fiber sheath polymer, is functionalized by DNA-binding groups and/or enderotoxin-binding groups and/or microbe-binding groups, preferably organic ammonium groups, more preferably quaternary ammonium groups, more particularly of the amine type or imine type. Textile fabrics or fiber sheath polymers functionalized accordingly may be produced, for example, by reaction of an unfunctionalized textile fabric or fiber sheath polymer with an amino-reactive, polymerizable compound and also by subsequent polymerization with monomers which contain cationic groups. Fiber sheath polymers functionalized accordingly may alternatively be produced by introduction of cationic groups into the polymer backbone and/or into side chains of an unfunctionalized fiber sheath polymer. The cationic groups may be introduced, for example, in a polymer-analogous reaction. The DNA-binding groups and/or enderotoxin-binding groups and/or microbe-binding groups advantageously endow the textile fabric with an additional function, namely the binding of DNA and/or enderotoxins and/or microbes, such as bacteria and/or viruses, for example. This enables with particular advantage the cleaning of a dialysate during the as-intended use of the dialyzer.

In further embodiment of the invention, the textile fabric comprises an at least partly water-soluble polymer or consists of an at least partly water-soluble polymer. This at least partly water-soluble polymer may more particularly be only partly water-soluble or completely water-soluble. The at least partly water-soluble polymer is preferably a polymer which is completely water-soluble, i.e., completely soluble in water. The at least partly water-soluble polymer is preferably selected from the group consisting of polyvinyl alcohol, polyethylene glycol, gelatin, starch, amylose, amylopectin, dextran, methylcellulose, hydroxymethylcellulose, hydroxyethylcellulose, hydroxypropylcellulose, hydroxybutylcellulose, hydroxypropylmethylcellulose, carboxymethylcellulose, hyaluronic acid, chondroitin 4-sulfate, chondroitin 6-sulfate, keratan sulfate, alginate, alginic acid, heparin, heparan sulfate, chitin, chitosan, salts of the aforesaid at least partly water-soluble polymers, derivatives of the aforesaid at least partly water-soluble polymers, and combinations, more particularly mixtures, of at least two of the aforesaid at least partly water-soluble polymers.

The at least partly water-soluble polymer is preferably polyvinyl alcohol. The polyvinyl alcohol may have a molecular weight of 5000 g/mol to 200 000 g/mol, more particularly 10 000 g/mol to 150 000 g/mol, preferably 10 000 g/mol to 100 000 g/mol.

The textile fabric may further comprise a water-insoluble polymer or consist of a water-insoluble polymer. The water-insoluble polymer is preferably selected from the group consisting of polyolefins, polyethylene, low-density polyethylene, high-density polyethylene, high molecular mass polyethylene, ultra-high molecular mass polyethylene, polypropylene, polyethylene terephthalate, polypropylene terephthalate, polybutylene terephthalate, polyacrylonitrile, PA 6, PA 6.6, PA 6.12, PA 12, silk, polytetrafluoroethylene, polyvinylidene difluoride, polytetrafluoropropylene, polyhexafluoropropylene, polyhydroxyalkanoic acids and/or polyhydroxyalkanoates, polyglycolic acid and/or polyglycolide, polylactic acid and/or polylactide, polydioxanone, poly-3-hydroxybutyric acid and/or poly-3-hydroxybutyrate, poly-4-hydroxybutyric acid and/or poly-4-hydroxybutyrate, polytrimethylene carbonate, poly-6-caprolactone, salts of the aforesaid water-insoluble polymers, derivatives of the aforesaid water-insoluble polymers, copolymers of the aforesaid water-insoluble polymers, and combinations, more particularly mixtures, of at least two of the aforesaid water-insoluble polymers.

It is preferred, furthermore, if the wrapped hollow fiber bundle outside the housing of the dialyzer has an oversize of 1% to 30%, based on the internal diameter of the dialyzer housing. This oversize is computed from the following formula I:

$$Db=Dgi\cdot(1+X),$$

where Db is the diameter of the wrapped hollow fiber bundle, Dgi is the internal diameter of the dialyzer housing, and X is the oversize factor, with X being able to adopt a value of 0.01 to 0.3.

It is preferred, furthermore, if the wound textile fabric bears gaplessly against the inside of the wall of the dialyzer housing.

In further embodiment of the invention, the textile fabric wraps the hollow fibers to form a wrapped construction which is three-ply at least in sections, more particularly only in sections. Preferably only one outer ply and one middle ply of the three-ply wrapped construction are joined to one another, more particularly by a material-bonded connection, preferably by a welded connection. The material-bonded connection, preferably welded connection, extends preferably in the longitudinal direction of the wound textile fabric. It is preferred, furthermore, for the middle ply and an inner ply of the three-ply wrapped construction not to be connected to one another, more particularly not by a material-bonded connection such as welded connection. As a result of this it is possible to reduce significantly or even eliminate entirely the risk of damage to the hollow fibers wrapped by the textile fabric. The inner ply of the three-ply wrapped construction accordingly serves preferably exclusively as a protective layer for the wrapped hollow fibers. The expression "outer ply" is intended here in the sense of the present invention to refer to the ply of the three-ply wrapped construction which in relation to the middle ply and inner ply of the three-ply wrapped construction has the greatest distance from the wrapped hollow fibers. The expression "inner ply" is intended in the sense of the present invention to refer to the ply of the three-ply wrapped construction which in relation to the outer ply and middle ply of the three-ply wrapped construction has the smallest distance from the wrapped hollow fibers. The expression "middle ply" is intended in the sense of the present invention to refer to the ply of the three-ply wrapped construction which is disposed between the outer ply and the inner ply of the three-ply wrapped construction.

According to a second aspect the invention relates to a dialysis machine which comprises a dialyzer in accordance with the first aspect of the invention.

With regard to further features and advantages of the dialyzer, reference is made completely to the observations made in the context of the first aspect of the invention, and also to the description still to follow. The features and advantages described therein in relation to the dialyzer are also valid, mutatis mutandis, in relation to the dialysis machine according to the second aspect of the invention.

According to a third aspect the invention relates to a kit more particularly for producing a dialyzer in accordance with the first aspect of the invention.

The kit comprises the following:
a multiplicity of hollow fibers wrapped with a textile fabric, the textile fabric being fluid-permeable, more particularly water- and/or dialysate-permeable, and/or at least partly, more particularly only partly or completely, water-soluble in design, and an insertion aid for inserting the multiplicity of hollow fibers wrapped with the textile fabric into a housing of the dialyzer.

The insertion aid is preferably a funnel-shaped insertion aid.

With regard to further features and advantages of the kit, reference is made completely to the observations made in the context of the first aspect of the invention, and also to the description still to follow. The features and advantages described therein in relation to the dialyzer, more particularly the multiplicity of hollow fibers, the housing of the dialyzer, and the textile fabric, are also valid, mutatis mutandis, in relation to the kit according to the third aspect of the invention.

According to a fourth aspect the invention relates to a process for producing a dialyzer, more particularly in accordance with the first aspect of the invention.

The process comprises the following steps:
wrapping a multiplicity of hollow fibers with a textile fabric, the textile fabric being fluid-permeable, more particularly water- and/or dialysate-permeable, and/or at least partly, more particularly only partly or completely, water-soluble in design, and inserting the multiplicity of hollow fibers wrapped with the textile fabric into a housing of the dialyzer.

The hollow fibers are produced preferably by means of a hollow fiber spinning unit, more particularly by means of a continuously operating hollow fiber spinning unit.

The hollow fibers emerging from the hollow fiber spinning unit are preferably wound up, generally in batches. The hollow fibers may be wound up by means of a winching apparatus, such as by means of a winching wheel, for example. The winching apparatus preferably has winding mandrels distributed uniformly over the periphery, on which the hollow fibers can lie. As a result, the hollow fibers can be stretched freely between the winding mandrels. The distances between the winding mandrels may preferably be chosen such that one hollow fiber bundle is formed between each pair of winding mandrels. These hollow fiber bundles are preferably wrapped by means of the textile fabric in such a way that the hollow fiber bundle acquires a circular cross section having a defined diameter specified in advance.

The number of hollow fibers wrapped by the textile fabric is preferably such that the resultant wrapped hollow fiber bundle has an oversize of 1% to 30%, based on the internal diameter of the housing of the dialyzer.

It is preferred, furthermore, for the hollow fibers to be wrapped with the textile fabric to form a wrapped construction which is three-ply at least in sections, more particularly only in sections. Preferably only one outer ply and one middle ply of the three-ply wrapped construction are connected to one another, more particularly by a material-bonded connection, preferably by a welded connection. The outer ply and the middle ply of the three-ply wrapped construction are materially bonded to one another, preferably welded to one another, more particularly in the longitudinal direction of the wound textile fabric. It is preferred, furthermore, for the middle ply and an inner ply of the three-ply wrapped construction not to be connected to one another, more particularly not by a material-bonded connection such as welded connection.

With particular preference the outer ply and the middle ply of the three-ply wrapped construction are connected to one another by thermal impulse welding. The outer ply and the middle ply of the three-ply wrapped construction may alternatively be connected to one another by other plastics welding methods, such as heatable tools or laser welding methods, for example.

With regard to further features and advantages of the process, reference is made completely to the observations made in the context of the first aspect of the invention, and also to the description still to follow. The features and advantages described therein in relation to the dialyzer, more particularly the multiplicity of hollow fibers, the housing of the dialyzer, and the textile fabric, are also valid, mutatis mutandis, in relation to the process according to the fourth aspect of the invention.

BRIEF DESCRIPTION OF THE DRAWING FIGURES

Further features and advantages of the invention are apparent from the description hereinafter of preferred exemplary embodiments of the invention, which are represented using the drawings.

DETAILED DESCRIPTION

Figure 1:
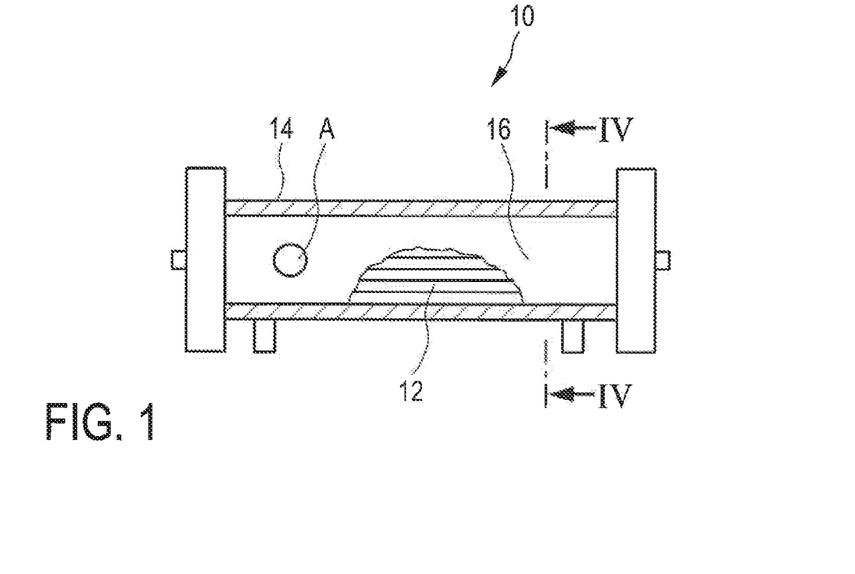
FIG. 1 shows a schematic longitudinal-sectional representation of one embodiment of a dialyzer of the invention.

FIG. 1 shows schematically a longitudinal-sectional representation of one embodiment of a dialyzer 10 according to the present invention.

The dialyzer 10 comprises a multiplicity of hollow fibers 12. The hollow fibers 12 are disposed in a housing 14 of the dialyzer 10. These hollow fibers 12 are extended in the longitudinal direction of the housing 14 and disposed alongside one another transverse to the longitudinal direction of the housing 14. The hollow fibers 12 are preferably disposed parallel or substantially parallel to one another. Axial end portions of the hollow fibers 12 are preferably accommodated in a hollow fiber embedment (not shown), made of polyurethane, for example.

The housing 14 is preferably tubular, more particularly round-tubular, in design. The housing 14 may further be produced of a plastic.

The hollow fibers 12 in the housing 14 are wrapped with a textile fabric 16. The textile fabric 16 wound around the hollow fibers 12 therefore forms a textile casing wrap or textile wrapped structure. The wound textile fabric 16 is preferably fastened by a material-bonded connection, preferably welded connection, 22 which extends in the longitudinal direction of the wound fabric 16 (see FIG. 4).

The hollow fibers 12 are collected together by the textile fabric 16 preferably to form a hollow fiber bundle, having more particularly a circular cross section.

The textile fabric 16 is fluid-permeable, more particularly water- and/or dialysate-permeable, and/or at least partly, preferably completely, water-soluble in design. The textile fabric 16 can consequently remain in the dialyzer housing 14. There is therefore no need for the textile fabric 16 to be removed from the dialyzer housing 14, hence enabling avoidance of the bent fiber-related disadvantages that are known in the context of generic dialyzers.

The textile fabric 16 preferably possesses a pore diameter, more particularly mean pore diameter, of 0.1 µm to 10 mm, more particularly 200 µm to 1 mm, preferably 1 mm to 5 mm. As a result of the aforesaid pore diameters, in particular, it is possible with particular advantage to ensure that the textile fabric 16 presents significant resistance neither when sealing the hollow fibers 12 with a casting compound to produce a hollow fiber embedment nor on dialysate flow during as-intended use of the dialyzer 10.

It may further be preferable for the textile fabric 16 to comprise fibers having a core-sheath construction, i.e., fibers having a fiber core and a fiber sheath that surrounds the fiber core at least partly, preferably completely. The fiber core preferably comprises a fiber core polymer and the fiber sheath a fiber sheath polymer, with the fiber core polymer preferably having a higher melting point than the fiber sheath polymer. The fiber core polymer may more particularly be a polyalkylene terephthalate, preferably polyethylene terephthalate, and the fiber sheath polymer may more particularly be a polyamide, preferably polyamide 6. As a result it is possible in the case, for example, of welded fastening of the wound textile fabric 16, using a welding temperature at which the fiber sheath polymer does melt but the fiber core polymer does not, to prevent weld penetration of the wound textile fabric 16 and hence damage to the hollow fibers 12.

The textile fabric 16 may alternatively be manufactured at least partly, more particularly completely, of a water-soluble polymer, preferably polyvinyl alcohol.

Figure 2:
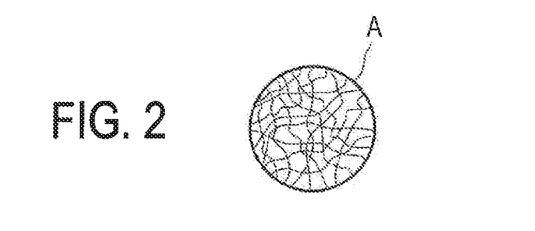
FIG. 2 shows schematically an enlarged detail of a wound textile fabric of a dialyzer of the invention in a region A according to FIG. 1.

FIG. 2 shows schematically an enlarged detail of a wound textile fabric 16 of a dialyzer 10 of the invention in a region A according to FIG. 1. The textile fabric 16 is designed as a nonwoven fabric. The nonwoven fabric may comprise, for example, fibers having a core-sheath construction, as described in the context of FIG. 1, and may have a basis weight of 30 g/m², a thickness of 0.25 mm, an air permeability (1 mbar) of 4500 l/m²s, a breaking strength of 55 N/5 cm, an elongation at break of 16%, a tear resistance of 40 N, a stiffness of 0.3 mN, and a fiber diameter of 37 µm. A nonwoven fabric of this kind is available commercially under the registered trademark COLBACK® WA 30.

Figure 3:
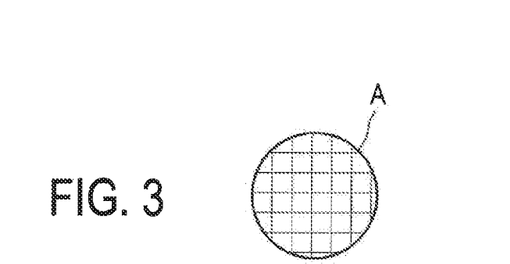
FIG. 3 shows schematically an enlarged detail of an alternative wound textile fabric of a dialyzer of the invention in a region A according to FIG. 1.

FIG. 3 shows schematically an enlarged detail of an alternative wound textile fabric 16 of a dialyzer 10 of the invention in a region A according to FIG. 1. The textile fabric 16 is designed as a woven fabric. The above-stated mesh sizes in particular represent advantageously a resistance which is negligible both toward a casting compound used for producing a hollow fiber embedment and toward a dialysate flow.

Figure 4:
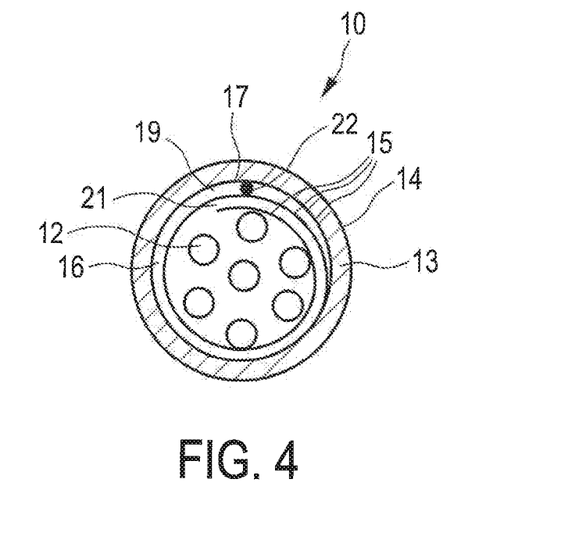
FIG. 4 shows a schematic cross-sectional representation of a dialyzer of the invention along a section line IV-IV according to FIG. 1.

FIG. 4 shows schematically a cross-sectional representation of a dialyzer 10 according to FIG. 1. The textile fabric 16 wraps the hollow fibers 12 to form a wrapped construction 15 which is three-ply at least in sections, more particularly only in sections, having an outer ply 17, a middle ply 19, and an inner ply 21. Preferably only the outer ply 17 and the middle ply 19 are connected to one another by a material-bonded connection, preferably welded connection, 22. In other words, the inner ply 21 is preferably not included in the material-bonded connection, more particularly welded connection, 22. The inner ply 21 therefore serves preferably exclusively as a protective layer for the hollow fibers 12. This makes it possible to prevent damage to the hollow fibers 12 when fastening or closing the wound textile fabric 16. The wound textile fabric 16 preferably bears gaplessly against the inside of the wall 13 of the housing 14.

Figure 5:
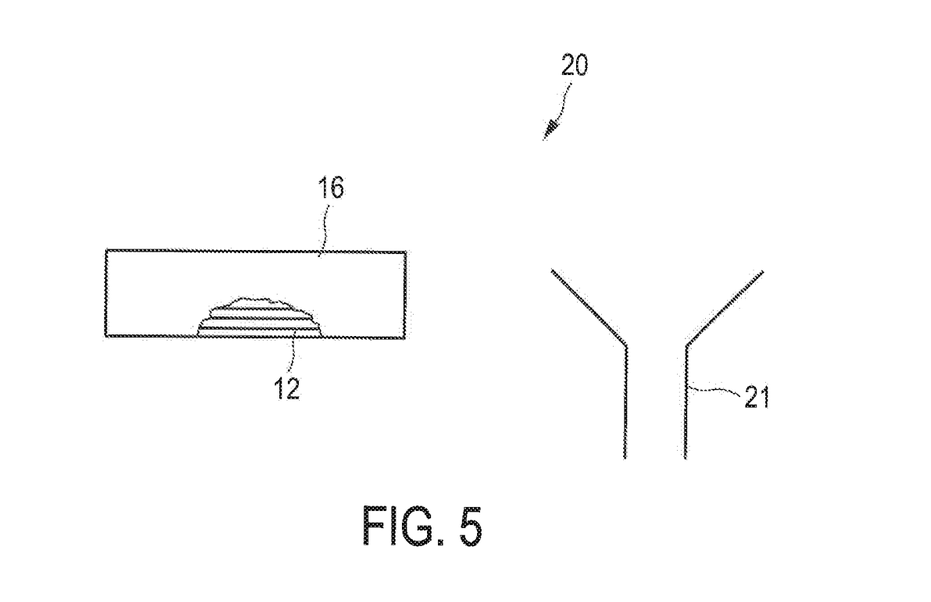
FIG. 5 shows schematically one embodiment of a kit of the invention.

FIG. 5 shows schematically one embodiment of a kit 20 of the invention.

The kit 20 comprises a textile fabric 16, which wraps a multiplicity of hollow fibers 12. The kit 20 further comprises an insertion aid 21 for inserting the multiplicity of hollow fibers 12 wrapped with the textile fabric 16 into a housing of a dialyzer. The insertion aid is preferably funnel-shaped in design.

With regard to further features and advantages of the textile fabric 16 and also of the multiplicity of hollow fibers 12, reference is made fully, in order to avoid repetitions, to the figure descriptions for FIGS. 1 to 4. The features and advantages described there especially in relation to the textile fabric 16, the hollow fibers 12, and the dialyzer 10 are also valid, mutatis mutandis, for the kit 20.

The invention claimed is:

1. A dialyzer comprising:
a housing; and
a plurality of hollow fibers disposed in the housing,
the plurality of hollow fibers being wrapped with a textile fabric,
the textile fabric being fluid-permeable and/or at least partly water-soluble in design,
the textile fabric comprising textile fibers each having a fiber core and a fiber sheath at least partly surrounding the fiber core,
each fiber core comprising a fiber core polymer having a first melting point,
each fiber sheath comprising a fiber sheath polymer having a second melting point,
the first melting point being higher than the second melting point.

2. The dialyzer according to claim 1, wherein the textile fabric has a mean pore diameter of 0.1 mm to 10 mm.

3. The dialyzer according to claim 1, wherein the textile fabric has a mean pore diameter of 200 μm to 1 mm.

4. The dialyzer according to claim 1, wherein the textile fabric is a nonwoven fabric.

5. The dialyzer according to claim 1, wherein the textile fabric is a woven fabric.

6. The dialyzer according to claim 1, wherein the textile fibers are bicomponent fibers.

7. The dialyzer according to claim 1, wherein the fiber core polymer is polyester.

8. The dialyzer according to claim 1, wherein the fiber sheath polymer is a polyamide.

9. The dialyzer according to claim 1, wherein the fiber core polymer is a polyalkylene terephthalate and/or the fiber sheath polymer is a polyamide.

10. The dialyzer according to claim 1, wherein the fiber core polymer comprises polyethylene terephthalate.

11. The dialyzer according to claim 1, wherein the fiber sheath polymer comprises polyamide 6.

12. The dialyzer according to claim 1, wherein the textile fabric is functionalized by binding groups selected from the group consisting of DNA-binding groups, endotoxin binding groups, and microbe-binding groups.

13. The dialyzer according to claim 1, wherein the textile fabric comprises an at least partly water-soluble polymer selected from the group consisting of: polyvinyl alcohol, polyethylene glycol, gelatin, starch, amylose, amylopectin, dextran, methylcellulose, hydroxymethylcellulose, hydroxyethylcellulose, hydroxypropylcellulose, hydroxybutylcellulose, hydroxypropylmethylcellulose, carboxymethylcellulose, hyaluronic acid, chondroitin 4-sulfate, chondroitin 6-sulfate, keratan sulfate, alginate, alginic acid, heparin, heparan sulfate, chitin, chitosan, salts of the aforesaid at least partly water-soluble polymers, derivatives of the aforesaid at least partly water-soluble polymers, and any combination thereof.

14. The dialyzer according to claim 1, wherein the textile fabric wraps the plurality of hollow fibers to form a wrapped construction which is a three-ply construction at least in sections.

15. The dialyzer according to claim 14, wherein the three-ply construction comprises an outer ply and a middle ply, the outer ply and the middle ply being joined to one another through a materially bonded connection.

16. The dialyzer according to claim 15, wherein the materially bonded connection is a welded connection.

17. A dialysis machine comprising a dialyzer according to claim 1.

18. A method for producing the dialyzer according to claim 1, the method comprising the steps of:
wrapping the plurality of hollow fibers with the textile fabric; and
inserting the plurality of hollow fibers into the housing.

* * * * *